United States Patent
Hoppe et al.

(10) Patent No.: US 6,280,533 B1
(45) Date of Patent: Aug. 28, 2001

(54) METHOD FOR IN SITU SOIL DECONTAMINATION AND MICRO-EMULSION SUITABLE THEREFOR

(75) Inventors: Karin Hoppe; Frank Dierkes, both of Düsseldorf; Franz-Hubert Haegel, Düren, all of (DE); Kirsten Mönig, Stavangar (NO); Günter Subklew, Herzogenrath (DE)

(73) Assignee: Dr. Fauz-Hubert Haegel, Düren (DE)

( * ) Notice: Subject to any disclaimer, the term of this patent is extended or adjusted under 35 U.S.C. 154(b) by 0 days.

(21) Appl. No.: 09/425,101

(22) Filed: Oct. 22, 1999

Related U.S. Application Data (63) Continuation-in-part of application No. PCT/EP98/02340, filed on Apr. 21, 1998.

(30) Foreign Application Priority Data

Apr. 22, 1997 (DE) .............................. 197 16 953

(51) Int. Cl.⁷ ..................................................... B09C 1/02
(52) U.S. Cl. ............................... 134/26; 134/19; 405/128
(58) Field of Search ................................. 71/27; 588/256, 588/255, 252, 249, 214, 205, 14; 516/43, 145; 134/26, 19; 510/502, 499, 439, 418, 412; 435/300.1, 282, 266, 262.5, 262; 405/264, 128; 210/747; 205/688

(56) References Cited

U.S. PATENT DOCUMENTS

| | | | |
|---|---|---|---|
| 5,158,704 | * | 10/1992 | Fulton et al. . |
| 5,523,013 | * | 6/1996 | Durbut et al. ..................... 252/12.1 |
| 5,634,983 | * | 6/1997 | Kammeraad ........................ 134/25.1 |
| 5,654,192 | * | 8/1997 | Decreux et al. ..................... 435/262 |
| 5,656,280 | * | 8/1997 | Herb et al. ........................... 424/401 |
| 5,763,386 | * | 6/1998 | Mondin et al. ...................... 510/417 |
| 5,770,172 | * | 6/1998 | Linehan et al. ................... 423/561.1 |
| 5,928,433 | * | 7/1999 | Jahnke et al. ............................ 134/2 |
| 6,099,206 | * | 8/2000 | Pennell ................................. 405/128 |

* cited by examiner

*Primary Examiner*—Margaret Einsmann
*Assistant Examiner*—Gregory E. Webb
(74) *Attorney, Agent, or Firm*—Klaus J. Bach (57) ABSTRACT

In a method for in situ cleanup of soil contaminated with a pollutant, a micro-emulsion containing an oil component with triglycerides, or essential oils or fatty acid esters or mixtures thereof, and a surfactant component of one or more branched or multi-chain anionic surfactants is used for pollutant extraction. The extraction of pollutant from the contaminated soil is carried out at a temperature range of 0° C. and 200 ° C. The oil component of the micro-emulsion contains one or more triglycerides or fatty acid esters in amounts $\geq 5\%$ by weight and less than 50% by weight, one or more dialkyl sulfosuccinic acid compounds as an anionic surfactant, and one or more branched, multi-chain or multi-chain branched non-ionic surfactants. The anionic and non-ionic surfactants are present in the micro-emulsion in an amount of $\leq 30\%$ by weight.

13 Claims, 5 Drawing Sheets

METHOD FOR IN SITU SOIL DECONTAMINATION AND MICRO-EMULSION SUITABLE THEREFOR

This is a continuation-in-part-application of international application PCT/EP98/02340 filed Apr. 21, 1998, and claiming the priority of German application 197 16 953.8 filed Apr. 22, 1997.

BACKGROUND OF THE INVENTION

The invention resides in a method for in situ cleanup of soil contaminated by pollutants wherein the pollutants are extracted from the soil by a micro-emulsion containing oil compounds and further in a micro-emulsion containing oil compounds that are suitable for the method.

Micro-emulsions are thermodynamically stable, optically isotropic dispersions of two or more immiscible liquids, liquid mixtures or solutions which are stabilized by adding at least a third amphiphilic component.

Most natural and technical micro-emulsions are comprised of water and oil or fat as immiscible phases. Such micro-emulsions can be stabilized by molecules having hydrophilic as well as lipophilic properties, for example, by surfactants. Depending on the composition and ratio of the phases there are three possibilities of distribution. If water is the outer and oil is the inner phase, an O/W micro-emulsion is present whose basic character is determined by the water. If oil is the outer and water the inner phase, a W/O micro-emulsion is present whose basic character is determined by the oil. In bi-continuous micro-emulsions the two immiscible liquids are not present as discrete droplets but are continuously distributed.

A wide range of technical applications is known for micro-emulsions, including their use as solvents for chemical reactions, as formulations in the medical, pharmaceutical, and cosmetics fields, and as extraction agents, for example, for removing pollutants from soils.

For the in situ cleanup of contaminated soils according to known methods, solutions containing surfactants are used (see, for example, Visser, J. et al.: Surfactants in the Mobilization of Pollutants, in: Contaminated Soil >95, Vol. II, eds.: van den Brink, W. J. et al., Kluwer Academic Publishers, Dordrecht, 1995, 1373–1374; Rosenstock, F. et al.: Process of Treating Contaminated Soils, U.S. Pat. No. 5,223,147; Schäfer, G. et al.: Reinigung eines mit Dieselöl kontaminierten künstlichen Aquifers unter Einsatz von Tensiden, in: In-situ Technologie zur Grundwasser- und Altlasternsanierung, Kurzfassung zum VEGAS Workshop & BMBF/PWAB-Seminar, eds.: Institut für Wasserbau der Universität Stuttgart, Stuttgart, 1996, 19–20). For the elimination of pollutants that are nearly insoluble in water, such as polycyclic aromatic hydrocarbons, the use of oil-in-water micro-emulsions with very low oil contents (<1%) has been suggested (see, for example, Bonkhoff, K et al.: Extraktion von polyzyklischen aromatischen Kohlenwasserstoffen aus belasteten Böden, in: Fremdstoffe in Böden Akkumulation, Bioverfügbarkeit, Bewertungsansätze, eds.: Arbeitsgemeinschaft der Großforschungseinrichtungen AGF, Bonn 1994, 34–36; Bonkhoff K. et al.: Extraktion von PAK aus belasteten Böden, in: Erdöl & Kohle Erdgas Petrochemie 1995, 48 (2) 63–64; Bonkhoff et al.: Basic investigations for an in situ-soil remediation with O/W micro-emulsion, in: Contaminated Soil >95, Vol. II, eds.: van den Brink, W. J. et al., Kluwer Academic Publishers, Derdrecht 1995, 957–967; Bonkhoff, K. et al. Bodensanierung mit Mikroemulsion —von der Extraktion bis zu mikrobiellen Nachsorge, in: Schriftenreihe Biologische Abwasserreinigung, eds.: SFB 193; Biologische Behandlung industrieller und gewerblicher Abwässer, Technische Universität Berlin, Berlin 1996). Furthermore, a cleanup method is known from published international patent application WO 94/04289 and also from U.S. Pat. No. 5,833,756 according to which the organic pollutants are extracted from the fine grains of solids by means of a micro-emulsion.

The use of micro-emulsions for all of the aforementioned applications has the disadvantage that, at low temperatures, the stability of the micro-emulsion is often impaired. At temperatures of □20□ C. a micro-emulsion forms liquid crystals and is then no longer suitable for the aforementioned applications.

It is therefore an object of the present invention to provide a method for in situ cleanup of soils in which the pollutants are extracted from the soil by a micro-emulsion without the micro-emulsion forming liquid crystals so that the micro-emulsion can be used at temperatures of 0° C. to 20□° C. It is further an object of the present invention to provide suitable micro-emulsions for the method.

SUMMARY OF THE INVENTION

In the method of the invention for in situ cleanup of soil contaminated with a pollutant, a micro-emulsion is prepared having an oil component and a surfactant component, wherein the oil component comprises one or more compounds from the group of triglycerides, essential oils and fatty acid esters, and wherein the sufactant component comprises one or more surfactants selected from the group consisting of branched anionic surfaciants, multi-chain anionic surfactants, and branched multi-chain anionic surfactants. The pollutant is extracted with the micro-emulsion from the contaminated soil at a temperature range of 0° C. to 20° C.

The micro-emulsion of the invention for in situ cleanup of soil contaminated with a pollutant has an oil component comprising one or more triglycerides or fatty acid esters in amounts $\geq 5\%$ by weight and <50% by weight, one or more dialkyl sulfosuccinic acid compounds as an anionic surfactant, and one or more non-ionic surfactants selected from the group consisting of a branched non-ionic surfactant, a multi-chain non-ionic surfactant, and a branched multi-chain non-ionic surfactant. The anionic and non-ionic surfactants are present in the micro-emulsion in an amount (total surfactant contents) of $\leq 30\%$ by weight.

DETAILED DESCRIPTION OF THE INVENTION

The method according to the invention for in situ cleanup of soils contaminated with pollutants is performed at temperatures of 0° C. to 20° C., preferably above approximately 10° C., wherein the pollutants are extracted from the soil by a micro-emulsion which contains as an oil component one or more triglycerides, essential oil, and/or fatty acid esters and one or more branched and/or multi-chain anionic surfactants. It was surprisingly found that such micro-emulsions are suitable for soil cleanup at the aforementioned low temperatures because no liquid crystal form. Furthermore, it was found that when using the aforementioned micro-emulsion for the in situ soil cleanup, the extraction efficiency that is the pollutant removal is considerably improved in comparison to conventional oil-in-water-micro-emulsions, especially when the micro-emulsion has a high oil contents ($\geq 5\%$ (. by weight), preferably in the form of rape seed oil methyl ester (RME).

Figure 5:
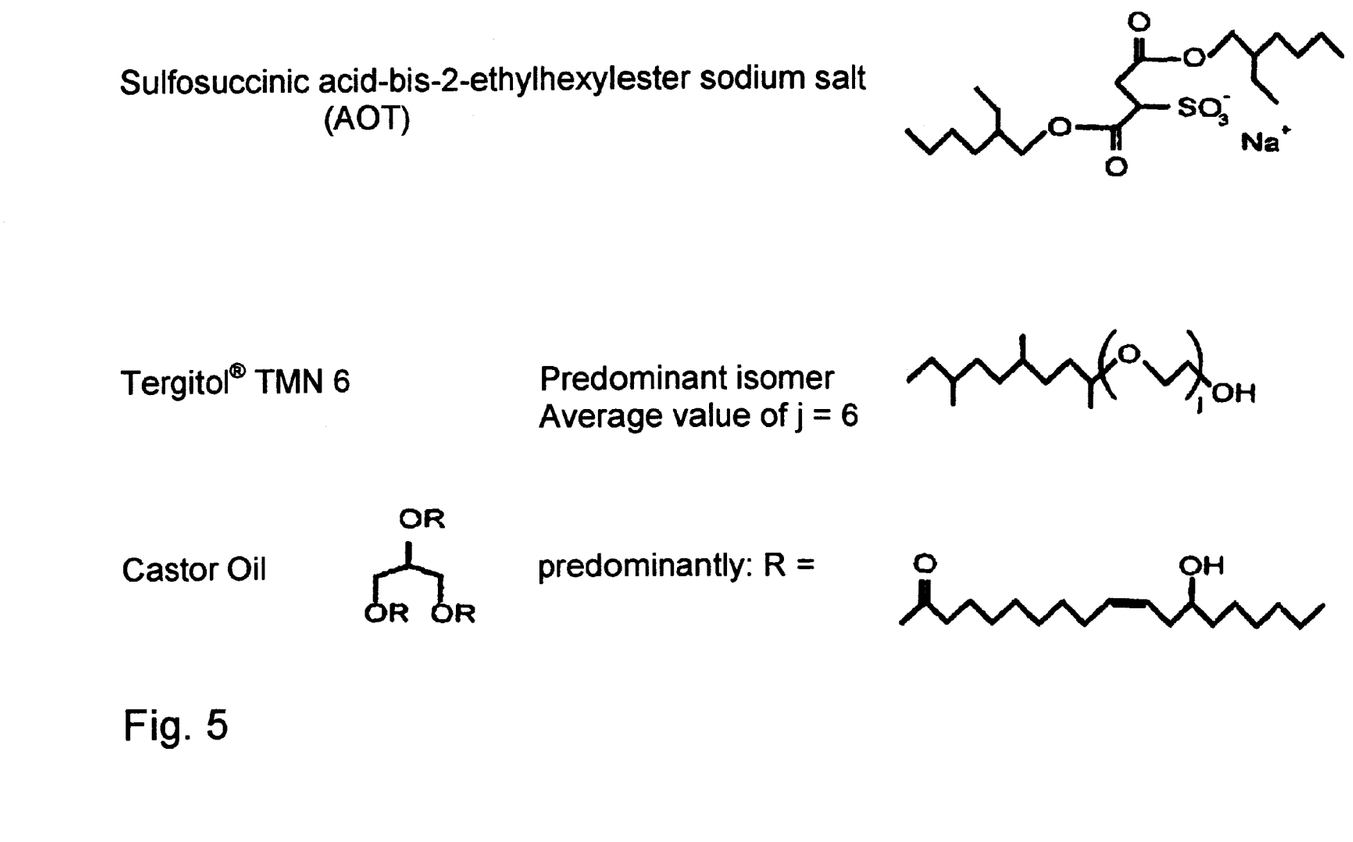
FIG. 5 shows chemical formulas of preferred surface active components of the micro-emulsion.

Preferably, an anionic surfactant with multiple and/or branched alkyl chains is used, especially sulfosuccinic acid-bis-2-ethylhexylester (Aerosol OT, AOT) or the corresponding sodium salt (see FIG. 5, top formula). Other anionic surfactants which, in principle, are also suitable are alkyl-benzenesulfonate or dialkyl phosphate.

Figure 1:
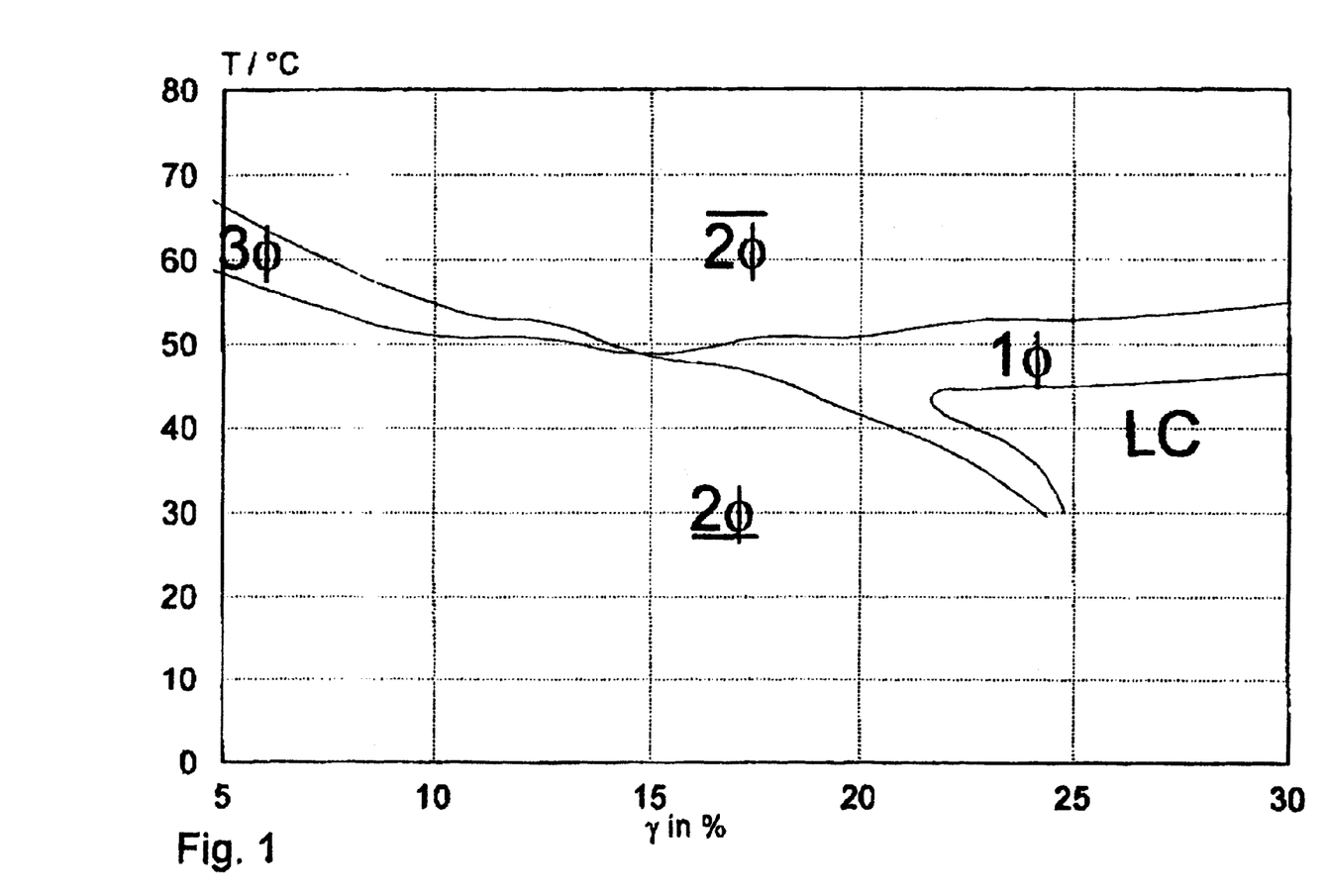
FIG. 1 shows the temperature-dependent behavior of a water/oil composition 1/1, containing Tergitol TMN6 as a surfactant, as a function of the surfactant content γ illustrating the single-phase, two-phase, and three-phase regions as well as the liquid crystal range.
Figure 2:
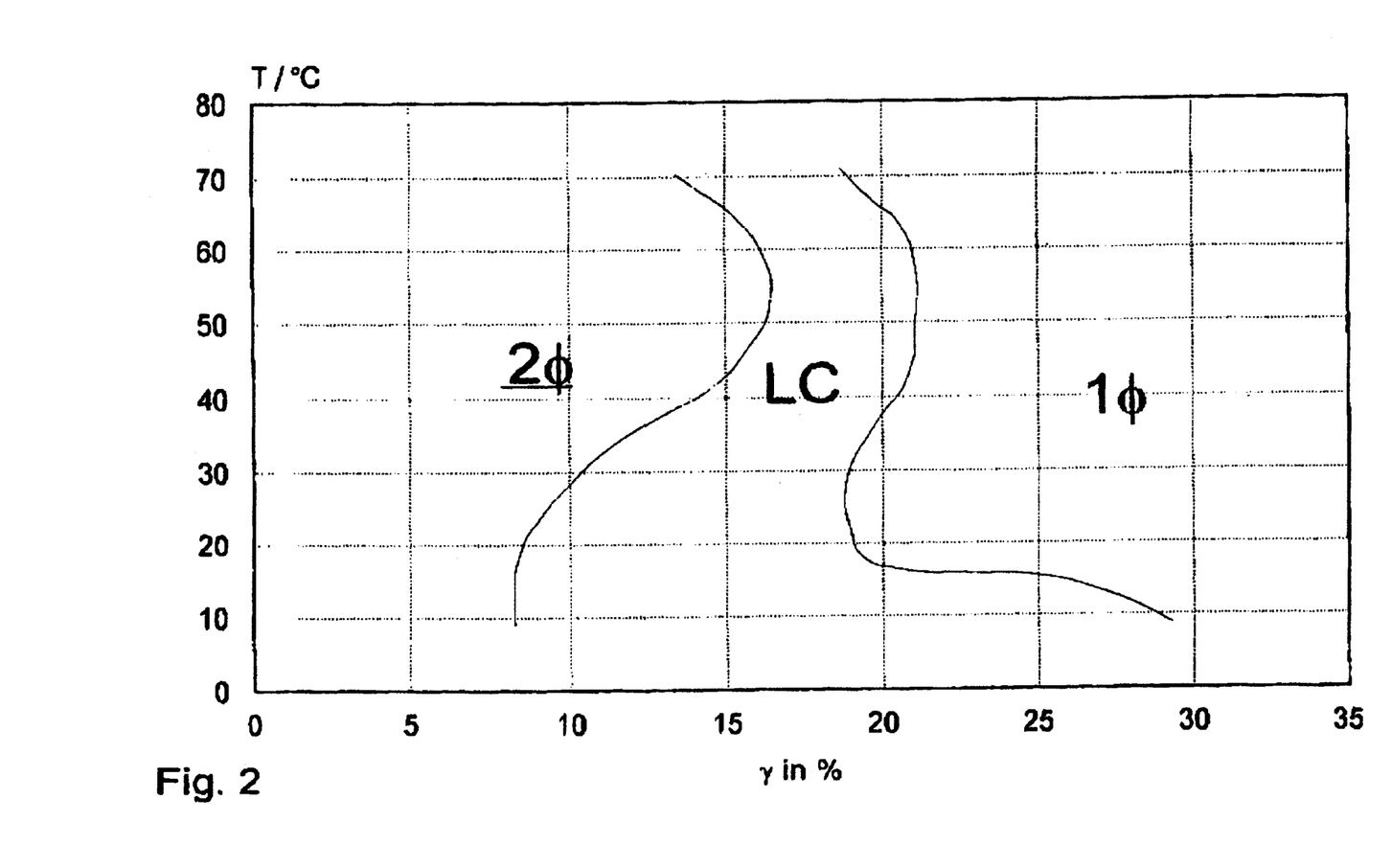
FIG. 2 shows the temperature-dependent phase behavior of a of water/RME composition 1/1 as a surfactant, as a function of the surfactant contents γ illustrating the single-phase and two-phase and three-phase regions as well as the liquid crystal range.
Figure 3:
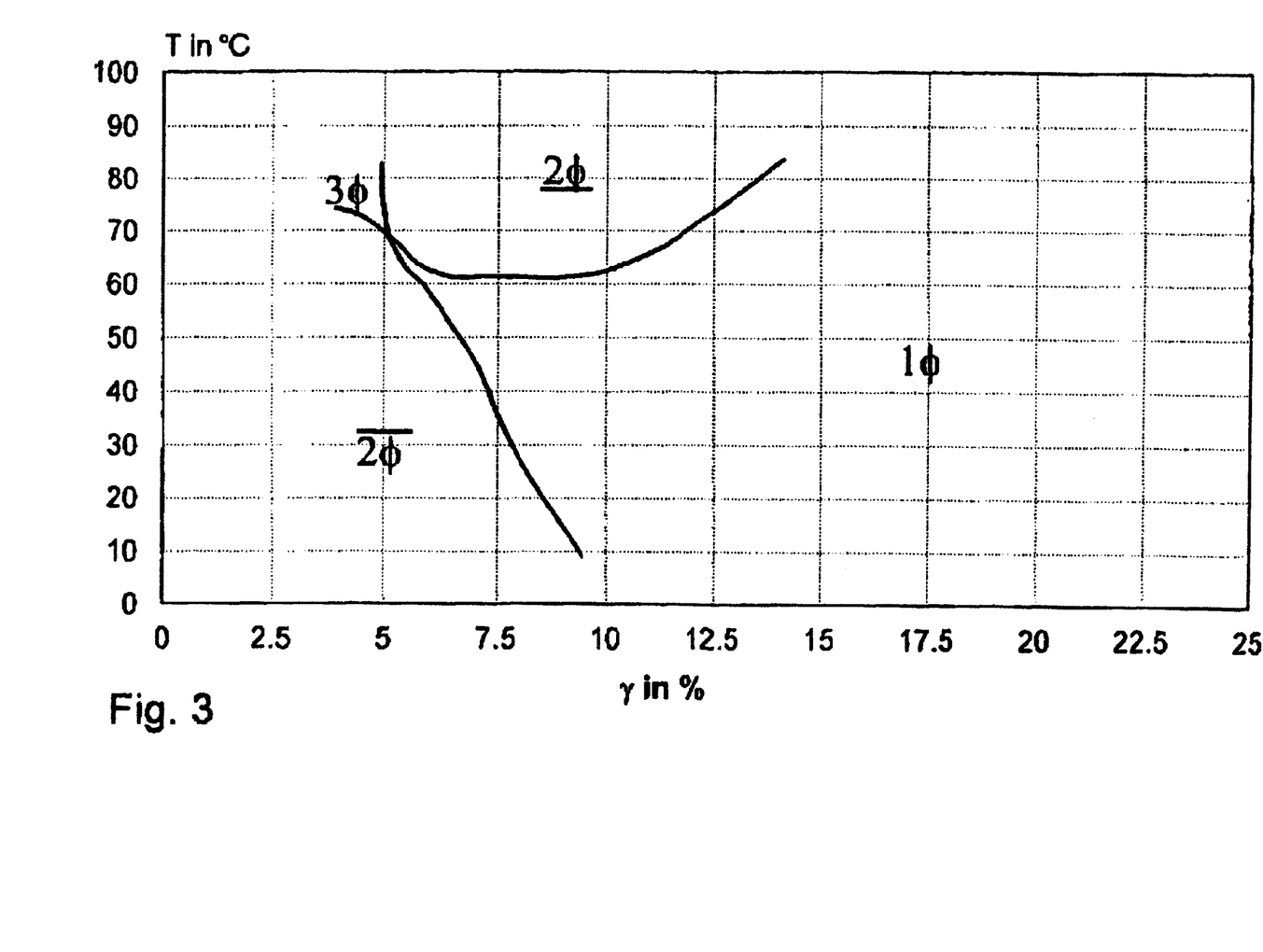
FIG. 3 shows the temperature-dependent behavior of a 0.25%-aq. $CaCl_2$/RME composition 1/1, containing AOT/Tergitol TMN6/Arlacel 989 7/2.7/0.3 as a surfactant mixture as a function of the surfactant content γ illustrating the single-phase, two-phase, and three-phase regions, with liquid crystal formation being suppressed oy Arlacel 989.
Figure 4:
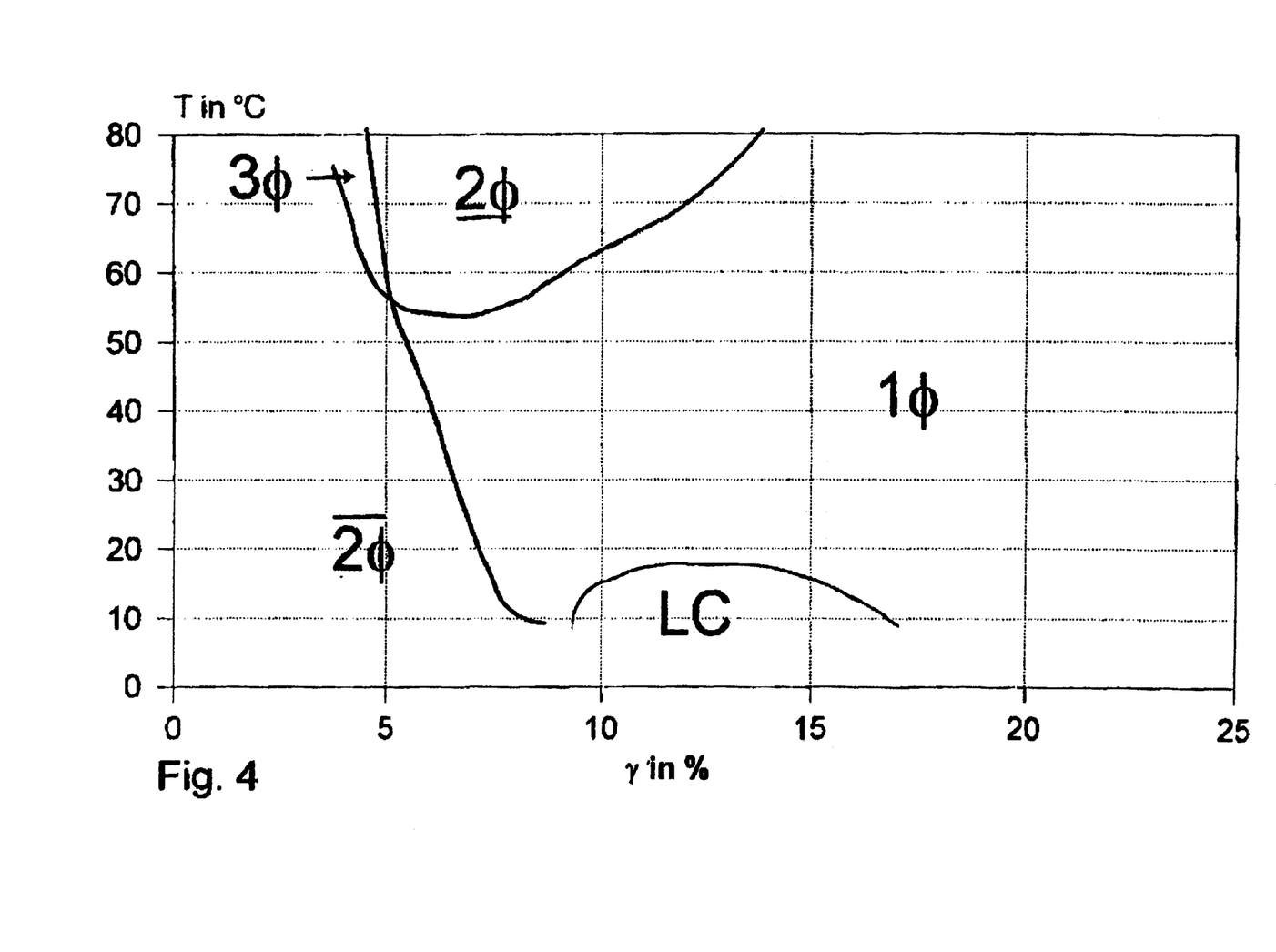
FIG. 4 shows the temperature-dependent behavior of a 0.25%-aq. Composition 1/1, containing AOT/Tergitol TMN6 7/3 as a surfactant mixture, as a function of the surfactant contents γ illustrating the single-phase, two-phase, and three-phase formation as well as the liquid crystal range.

For performing the inventive method, the micro-emulsion contains furthermore especially one or more branched and/or multi-chain surface active components, preferably a surfactant and especially a non-ionic surfactant. The addition of a non-ionic surfactant has primarily the advantage that the insoluble calcium and/or magnesium salts of the anionic surfactants are kept in solution. Especially surfactants with branched chains, as, for example, trimethylnonyl hexa-ethoxylate ether (Tergitol TMN6, see FIG. 5, center formula), can be used as non-ionic surfactants because these components further reduce the liquid crystal formation. When adding a non-ionic surfactant, the ratio of anionic to non-ionic surfactant should be selected such that the phase behavior corresponds to that of an anionic surfactant. Ternary mixtures of water, oil, and nonionic surfactants which are able to form micro-emulsions exhibit at high temperatures always a two-phase region (2Φ) in which the surfactant is preferably dissolved within the oil, while at low temperatures a two-phase region (2Φ) is formed in which the surfactant is substantially enriched within the lower aqueous phase. Between these two two-phase regions, a three-phase region (3Φ) or a single-phase region (1Φ), i.e., a microemulsion, can be formed. A corresponding diagram for one of the surfactants mentioned in the examples (Tergitol TMN6) is shown in FIG. 1. Tergitol TMN6 is a 90% aqueous solution of the active ingredient trimethylnonyl hexaethoxy-late. The concentration values given in the examples for this surfactant are based on the active ingredient contents, i.e., the water content has been taken into consideration for the microemulsion composition. The behavior with respect to the two-phase region is exactly the opposite for anionic surfactants. Anionic surfactants will dissolve primarily in the aqueous phase at high temperatures. FIGS. 2 to 4 show such a behavior. For the system water, rape seed oil methyl ester/ AOT shown in FIG. 2, the two-phase region (2Φ) is below the observed area.

The inventive feature of selecting the ratio of anionic surfactant and non-ionic surfactant such that the phase behavior corresponds to that of an anionic surfactant enables a separation of the micro-emulsion by a temperature increase such that the surfactant remains primarily in the aqueous phase while hydrophobic components, especially hydrophobic pollutants, can be separated with the oil phase.

Even in a micro-emulsion of, for example, 20% AOT, 40% water, and 40% rape seed oil methyl ester (RME), liquid crystal formation occurs only below 20° C. (compare, for example, FIG. 2). However, for lower surfactant concentrations the liquid crystals are present over the entire range of 0° C. to 70° C. The liquid crystal formation can be completely suppressed within the range of 0° C. to 80° C. and a total surfactant concentration of 0 to 15% (see, for example, FIG. 3) when the following substances are added: a branched non-ionic surfactant, an electrolyte (such as 0.25% $CaCl_2$ in the added water), and a further multi-chain and highly branched surface-active component (such as 3% castor oil ethoxylate instead of an anionic surfactant). The branched non-ionic surfactant may be Tergitol TMN6 which can replace, for example, up to 27% of the anionic surfactant. The castor oil ethoxylate can be a surfactant, i.e., it can be capable of micelle formation, but must not be surfactant. A partial suppression of the liquid crystal formation, which is basically satisfactory for in situ soil cleanup, can already be achieved with, e.g., Tergitol TMN6 alone for a total surfactant contents γ=8 to 9% (compare, for example, FIG. 4).

Overall, the micro-emulsion should have a total surfactant composition of preferably ≦30% by weight.

The formula of castor oil is shown in FIG. 5 (bottom formula).

The micro-emulsions to be used for the inventive soil decontamination method contain an oil component of one or more oil compounds, in particular, triglycerides, essential oils, and/or fatty acid esters. The use of these oil compounds in the soil decontamination method has the advantage that these oils are biologically and toxicologically innocuous. Preferably, rape seed oil methyl ester is used because this product is available at an affordable price in large amounts as bio diesel fuel.

The oil compound content is preferably 5 to 80% by weight, especially ≧15% by weight. Such a high oil content has the advantage that hydrophobic components can be dissolved in high concentrations. Water is used as a further immiscible component. However, the use of other liquids that are immiscible with the oil compounds is also possible, e.g., liquids such as glycerol or glycol. Preferably, the micro-emulsion is bicontinuous.

The use of the aforementioned micro-emulsions according to the method of the invention as an extraction agent for pollutants contained in soils often entails the problem that, if the micro-emulsion contains an anionic surfactant, this anionic surfactant generally has little tolerance with respect to the calcium ions present in the soil, so that insoluble calcium salts are precipitated. It is therefore preferred to add one or more electrolytes, especially calcium salts, to the micro-emulsion for performing the inventive soil cleanup method. As a result a high tolerance relative to the calcium contained in the soil is achieved. For this purpose, calcium chloride may be used as a calcium salt in concentrations which are considerably higher than naturally occurring calcium concentrations in the groundwater. Water with 500 mg/l $CaCl_2$ already has a very high hardness of 25° dH. Preferably, a four-fold to 20-fold amount, especially a five-fold amount, of calcium chloride is added to the micro-emulsion.

The micro-emulsion suitable for the method of the invention contains as an oil component ore or more triglycerides or fatty acid ester in an amount ≧5% by weight and less than 50% by weight, one or more branched and/or multi-chain anionic surfactants, and one or more branched and/or multi-chain non-ionic surfactants with a total surfactant content of ≦30% by weight. The water content is preferably at least 35% by weight and the total surfactant contents is preferably ≦15% by weight. Moreover, castor oil ethoxylate, especially Arlacel 989, can be used as a branched, multi-chain non-ionic surfactant in the inventive micro-emulsion. Preferably, trimethylnonyl hexaethoxylate is used as a non-ionic surfactant in the inventive micro-emulsion, and bis-(2-ethylhexyl) sulfosuccinate is used as an anionic surfactant. Preferably, rape seed oil methyl ester is used as a fatty acid ester. In addition, especially for soil cleanup (see supra) one or more electrolytes, preferably a calcium salt and/or magnesium salt, may be contained in the micro-emulsion.

The invention, will be explained below on the basis of the accompanying drawings.

DESCRIPTION OF PREFERRED EMBODIMENTS

Below, the benefits and advantages of the present invention will be explained in greater detail employing specific examples.

EXAMPLES

1. Manufacture of different micro-emulsions 1.1. Anionic surfactant Aerosol OT (AOT) in the amount of 30% by weight was dissolved in 35% by weight of RME. Subsequently, water in the amount of 35% by weight was added. The phase behavior of the system water/RME/AOT is represented in FIG. 2. As can be seen in FIG. 2, at a total surfactant content γ=30% a micro-emulsion (single phase system 1φ) will be formed in a temperature range above 10° C. up to 70☐ C.

1.2. The two-chain branched anionic surfactant AOT in an amount of 6.3% by weight and branched non-ionic surfactant Tergitol TMN6 in an amount of 2.7% by weight were dissolved in 45.5% by weight rape seed oil methyl ester. Subsequently, 45.5% by weight of an 0.25% by weight aqueous solution of $CaCl_2$ was added. The phase behavior of the composition containing 0.25% aqueous $CaCl_2$/RME/(AOT/Tergitol TMN6 7/3) is shown in FIG. 4. As can be taken from FIG. 4, no liquid crystals were found between 10 and 80° C. for γ=9%. Accordingly, the system of the example 1.2 with γ=9% is a single phase system in this temperature range.

1.3 For widening the range of the single-phase micro-emulsion according to example 1.2 by suppressing liquid crystal formation, 10% of Tergitol TMN6 were replaced by castor oil ethoxylate (Arlacel 989). The mixture contained the following:

6.3% by weight AOT, 2.43% by weight Tergitol TMN6, and 0.27% by weight Arlacel 989, wherein all components, as in example 1.2, are dissolved in 45.5% by weight of rape seed oil methyl ester. As mentioned above for example 1.2, 45.5% by weight of an 0.25% by weight aqueous solution of $CaCl_2$ was added. The phase behavior of the system 0.25% aqueous CaCl2 solution/RME/(AOT/Tergitol TMN6/Arlacel 989 7/2.7/0.3) is represented in FIG. 3. As can be seen in FIG. 3, no liquid crystal formation was observed between 10 and 80° C. for γ=9 to 25%. Accordingly, the system of example 1.3 with γ=9% is also a single phase micro-emulsion in this temperature range.

1.4 AOT in an amount of 7% by weight, Tergitol TMN6 in an amount of 2.7% by weight, and Emulan EL in an amount of 0.3% by weight were dissolved in 45% by weight rape seed oil methyl ester. To this solution an 0.25% aqueous solution of $CaCl_2$ was added in an amount of 45% by weight.

The phase behavior of the system 0.25% aqueous $CaCl_2$ solution/RME/(AOT/Tergitol TMN6/Emulan EL 7:2,7:0.3) corresponds substantially to that of example 1.3 (see FIG. 3).

1.5 A micro-emulsion for a large-scale experiment (see example 3.2) was produced from 42.7% by weight of an 0.25% by weight aqueous $CaCl_2$ solution, 45% rape seed oil methyl ester, 9.3% by weight of a multi-chain anionic surfactant (Leophen RA, BASF AG) and 3% by weight castor oil ethoxylate (EmuLan EL, BASF AG). The numerical values relate to the raw material concentration of the technical products, not to the effective ingredient concentration. The density of the micro-emulsion was 0.97 kg $dm^{-3}$.

2. Proof of flowability of a micro-emulsion through a body of soil

In a column experiment the flowability of a micro-emulsion through a soil body was determined. The amount of soil material in the column (diameter 100 mm, length 800 mm, volume approximately 6 l) was approximately 8 kg. For an estimated porosity of 0.4, the column had a pore volume of approximately 2.4 l. The lower part. of the column was filled up to a filling level of approximately 55 cm with a mixture of sand and orthic luvisol. Atove this mixture, a layer of soil, originating from a coking plant cleanup site and contaminated with polycyclic aromatic hydrocarbon, was placed. The body of soil was first filled with water from below at a hydraulic gradient of 20% while maintaining a constant liquid level. Subsequently, approximately 6 l of a micro-emulsion was infiltrated from below. Approximately 1 l of the micro-emulsion was recovered at the top of the column. When balancing the liquid volumes, one must take into consideration that the apparatus has a dead volume (tubes, semi-spherical end caps of the column) of approximately 2.5l. The liquid balance is as follows: 2.5 liter dead volume, 2.4 liter pore volume, and 1 liter liquid recovery resulting in a total of 6 liter, the amount mentioned above.

After completion of the experiment, i.e., after throughput of 6 liter of micro-emulsion, the liquid, i.e., the micro-emulsion, was drained in the downward direction from the soil. Samples were taken at different levels and areas of the column. The micro-emulsion components could be detected in all areas, i.e., despite the slightly increased viscosity of the micro-emulsion, flow of the micro-emulsion through the entire soil material in the column had taken place. The formation of preferred channels, which was to be expected because of the increased viscosity of the micro-emulsion, was not observed. This result shows that micro-emulsions within the given range of composition provide good or satisfactory flowability in a body of soil and are thus suitable for soil cleanup.

3. Pollutant extraction 3.1 A soil doped with PCBs originating from the A-horizon of a orthic luvisol was subjected to extraction with the micro-emulsion of example 1.4 in batch experiments at 10° C. The pollutant (24 milligrams PCBs per kilogram soil) was quantitatively extracted.

3.2 The soil of example 3.1 was extracted in a column (length 100 mm, diameter 200 mm) at 10° C. with the micro-emulsion of example 1.4. The pollutant recovery was approximately 78%.

3.3 The micro-emulsion of example 1.5 was used for cleanup of an artificial sandy aquifer contaminated with trichloroethylene. The experiment vias performed in a large trough of the Experimental Facility for Groundwater and Environmental Decontamination at the University of Stuttgart. The dimensions of the container were: length 6.4 m, depth 1 m, height 2.6 m. The total volume of 16.6 m³ was filled almost completely with sand of low permeability ($k_f=1\times10^{-4}$ m/s). The front of the trough that is provided with glass windows, was filled with a sand of good permeability ($k_f=35\times10^{-4}$ m/substitute) and areas of sand of lower permeability ($k_f=12\times10^{-4}$ m/s and $k_f=3\times10$ m/s). In this region occupying a volume of approximately 6.1 m³, approximately 30 kg of trichloroethylene were infiltrated. The solutions for flushing the aquifer were infiltrated via three infiltration wells. The extraction from the aquifer was performed via four further wells by means of a peristaltic pump. The spacing between the infiltration and extraction wells, which were alternating arranged in a row, was 0.9 m. First, 2.5 m³ (approximately 1 pore volume) of a 3% Emulan EL solution was introduced. Subsequently, 5 m³ approximately 2 pore volumes) of the micro-emulsion were introduced. Then the system was flushed with 2.5 m³ (approximately 1 pore volume) of 3% Emulan EL solution and 3.5 m³ water. The most important results of the experiment can be summarized as follows:

1. In contact with the water present in the artificial aquifer, the micro-emulsion first separates into an oil-containing phase and a surfactant-containing phase. The excess oil however will re-dissolve in the following in-flowing micro-emulsion. An impairment of the flow behavior by the separation was not observed.
2. The micro-emulsion, because of its excellent wetting properties, was able to penetrate even the areas of minimal permeability. Therefore, the given pre-calculated two pore volumes for the micro-emulsion do not correspond to the actual value.
3. The pollutant (trichloroethylene) having a greater density than water (dense non-aqueous phase liquid =DNAPL) was transported by the micro-emulsion upwardly because of the low density of the micro-emulsion. This result confirms the inherent safety of the method, which prevents mobilization of DNAPL into lower soil layers.
4. The maximum trichloroethylene concentration in the removal wells was more than 14 g/l.
5. After completion of the experiment, soil samples were taken from the initially highly contaminated areas. According to the test results based on the samples, at least 84% of the pollutant was removed.
6. The entire experiment took two months.

What is claimed is:

1. A method for in situ cleanup of soil contaminated with a pollutant, said method comprising the steps of:
   preparing a micro-emulsion having an oil component and a surfactant component, wherein said oil component comprises at least one compound selected from the group consisting of triglycerides, essential oils and fatty acid esters, and said surfactant component is sulfosuccinic acid bis-2 ethylhexylester, and
   flowing said micro-emulsion through said contaminated soil at a temperature of between 0° C. and 20° C., thereby extracting the pollutant from said contaminated soil.

2. A method according to claim 1, wherein, in said step of preparing, at least one surface-active agent is added, said at least one additional surface-active agent being selected from the group consisting of a branched surface-active agent, a multi-chain surface-active agent, and a branched multi-chain surface-active agent.

3. A method according to claim 2, wherein said additional surface-active agent is a non-ionic surfactant.

4. A method according to claim 3, wherein a ratio of said anionic surfactants to said non-ionic surfactants is selected such that a phase behavior of an anionic surfactant results.

5. A method according to claim 2, wherein said anionic surfactants and said additional surface-active agents are present in said micro-emulsion in an amount of $\leq 30\%$ by weight.

6. A method according to claim 1, wherein said oil component is present in an amount of 5 to 80% by weight.

7. A method according to claim 6, wherein said oil component is present in an amount $\geq 15\%$ by weight.

8. A method according to claim 1, wherein, in said step of preparing, at least one electrolyte is added.

9. A method according to claim 8, wherein said at least one electrolyte is selected from the group consisting of calcium salt and magnesium salt.

10. A method for in situ cleanup of soil contaminated with a pollutant, said method comprising the steps of:
    preparing a micro-emulsion having an oil component, a surfactant component and castor oil ethoxylate, wherein said oil component comprises at least one compound selected from the group consisting of triglycerides, essential oils and fatty acid esters, and said surfactant component comprises at least one surfactant selected from the group consisting of a branched anionic surfactant, a multi-chain anionic surfactant, and a branched multi-chain anionic surfactant, and
    flowing said micro-emulsion through said contaminated soil at a temperature of between 0° C. and 20° C., thereby extracting the pollutant from said contaminated soil.

11. A method for in situ cleanup of soil contaminated with a pollutant, said method comprising the steps of:
    preparing a micro-emulsion having an oil component and a surfactant component, wherein said oil component is rape seed oil methyl ester, and said surfactant component comprises at least one surfactant selected from the group consisting of a branched anionic surfactant, a multi-chain anionic surfactant, and a branched multi-chain anionic surfactant, and
    flowing said micro-emulsion through said contaminated soil at a temperature of between 0° C. and 20° C., thereby extracting the pollutant from said contaminated soil.

12. A method for in situ cleanup of soil contaminated with a pollutant, said method comprising the steps of:
    preparing a bi-continuous micro-emulsion having an oil component and a surfactant component, wherein said oil component comprises at least one compound selected from the group consisting of triglycerides, essential oils and fatty acid esters, and said surfactant component comprises at least one surfactant selected from the group consisting of a branched anionic surfactant, a multi-chain anionic surfactant, and a branched multi-chain anionic surfactant, and flowing said micro-emulsion through said contaminated soil at a temperature of between 0° C. and 20° C., thereby extracting the pollutant from said contaminated soil.

13. A method for in situ cleanup of soil contaminated with a pollutant, said method comprising the steps of:

preparing a micro-emulsion having an oil component and a surfactant component, wherein said oil component comprises at least one compound selected from the group consisting of triglycerides, essential oils and fatty acid esters, and said surfactant component comprises a mixture of a non-ionic surfactant and at least one surfactant selected from the group consisting of a branched anionic surfactant, a multi-chain anionic surfactant, and a branched multi-chain anionic surfactant, wherein a mixing ratio is Selected such that a phase behavior of an anionic surfactant is obtained, and flowing said micro-emulsion through said contaminated soil at a temperature of between 0° C. and 20° C., thereby extracting the pollutant from said contaminated soil.

* * * * *